(12) United States Patent (10) Patent No.: US 7,763,573 B2
Hajmrle et al. (45) Date of Patent: Jul. 27, 2010

(54) METHOD FOR PRODUCING COMPOSITE MATERIAL FOR COATING APPLICATIONS

(75) Inventors: Karel Hajmrle, Edmonton (CA); William Walkhouse, Edmonton (CA); Petr Fiala, Fort Saskatchewan (CA)

(73) Assignee: Sulzer Metco (Canada) Inc., Fort Saskatchewan, Alberta (CA)

( * ) Notice: Subject to any disclaimer, the term of this patent is extended or adjusted under 35 U.S.C. 154(b) by 976 days.

(21) Appl. No.: 11/449,798

(22) Filed: Jun. 9, 2006

(65) Prior Publication Data

US 2006/0293194 A1 Dec. 28, 2006

Related U.S. Application Data

(63) Continuation-in-part of application No. 10/727,485, filed on Dec. 5, 2003.

(51) Int. Cl.
*C10M 125/04* (2006.01)
(52) U.S. Cl. .................. 508/103; 508/108; 508/113; 508/136; 508/141; 508/150; 508/154; 508/155; 508/167
(58) Field of Classification Search ............. 508/108, 508/109, 113, 150, 103, 136, 141, 154, 155, 508/167
See application file for complete search history.

(56) References Cited

U.S. PATENT DOCUMENTS

| | | | |
|---|---|---|---|
| 4,039,337 A | 8/1977 | Brown et al. | |
| 4,233,254 A * | 11/1980 | Sato et al. | 264/37.29 |
| 5,294,355 A | 3/1994 | King et al. | |
| 5,315,970 A | 5/1994 | Rao et al. | |
| 5,332,422 A | 7/1994 | Rao et al. | |
| 5,492,639 A | 2/1996 | Schneider et al. | |
| 5,601,933 A | 2/1997 | Hajmrle et al. | |
| 5,976,695 A | 11/1999 | Hajmrle et al. | |
| 6,177,386 B1 | 1/2001 | Aurin | |
| 2004/0005452 A1 * | 1/2004 | Dorfman et al. | 428/323 |

FOREIGN PATENT DOCUMENTS

| | | |
|---|---|---|
| CA | 2111273 | 6/1994 |
| JP | 10-158668 | 6/1998 |

* cited by examiner

*Primary Examiner*—Glenn A Caldarola
*Assistant Examiner*—Taiwo Oladapo
(74) *Attorney, Agent, or Firm*—Arne I. Fors

(57) ABSTRACT

The production of solid lubricant agglomerates by combining solid lubricant powder, an inorganic binder, other fillers if optionally desired, and a liquid to form a mixture, and driving off the liquid to form dry agglomerates which are subsequently classified by size or milled and classified by size to yield agglomerates of a desired size range. These agglomerates are then treated to stabilize the binder, thereby strengthening the binder and rendering it nondispersible in the liquid. The treated agglomerates are then blended or clad with a metal, metal alloy or a metallic composition, to produce a composition suitable for thermal spray applications.

26 Claims, 2 Drawing Sheets

METHOD FOR PRODUCING COMPOSITE MATERIAL FOR COATING APPLICATIONS

This is a Continuation-In-Part patent application of U.S. application Ser. No. 10/727,485 Filed on Dec. 5, 2003.

BACKGROUND OF THE INVENTION

1. Field of the Invention

This invention relates to a method for the production of solid lubricant agglomerates and, more particularly, to a method for the production of rounded hexagonal boron nitride agglomerates within a desired size range and of a predetermined composition and density.

2. Description of the Related Art

Solid lubricants such as hexagonal boron nitride (hBN) powders are blended or clad with matrix forming metal and blended with other additives to form thermal spray compositions used as abradable seals on gas turbine engines, turbochargers, steam turbines and other rotary equipment. Such an application is, for instance, described in U.S. Pat. No. 5,976,695 by K. Hajmrle et al. Among other thermal spray applications using solid lubricant compositions, is protection of compressor disc and blades against fretting as described in U.S. Pat. No. 5,601,933 by K. Hajmrle et al.

For thermal spray and other applications, larger particles than those resulting from conventional hBN production techniques are necessary. By its nature, the synthesis of hBN produces particulates smaller than 10 microns whereas thermal spray applications require larger particles in the range of 20 to 150 microns.

It is well known in the art to produce solid lubricant particles of hBN by hot pressing fine particles of hBN to form large agglomerates and subsequently crushing, milling and classifying the resulting particles to the desired particle size range. This process is expensive due to the high cost of the several manufacturing steps, especially the high temperature hot pressing step. The cost of the product is further increased because of the production of undersize which must be discarded as waste, and oversize particles which must be further crushed and processed. The undersize fine fraction lowers the process recovery substantially.

The final product produced by the "hot pressing" method is relatively soft which causes problems in further processing. For instance, when such material is further processed by hydrometallurgical metal cladding in an autoclave, the particles disintegrate to a high degree and the particle size of the final product is difficult to control. Stronger particles are required in this application. Stronger particles are also an advantage in powder mixes when two or more different powders are mechanically blended. The soft particles prepared by the hot pressing method have to be handled more gently.

The low recovery of the hot pressing process for producing large hBN particles results in high cost product. The narrower the required particle size cut, the higher the scrap rate and the product cost. For that reason, compromises must be made and wider particle size cuts used then those required for a particular process or product. Exact tailoring of particle size is impractical due to high hBN cost. These compromises lead to inefficiencies in subsequent thermal spraying such as low deposit efficiency and low retention of hBN in the spray coating.

Another disadvantage of prior art hBN particles is the angular and irregular shape of the particles, which may cause problems in powder feeding during thermal spraying.

A further disadvantage of the prior art hBN particles is the inflexibility in composition and density of the particles. For instance, addition of fillers, i.e. other solid particles, to hBN composition is limited by the hot pressing process that is carried out at high temperatures and pressures.

SUMMARY OF THE INVENTION

In a broad aspect, there is provided a method comprising combining particulate solid lubricant, an inorganic binder, and a liquid to produce a workable mixture. Fillers can also be added to the solid lubricant-binder-liquid mixture to lower the cost of the final product or to enhance its properties.

The above mixture, which may have high or low viscosity, is then dried by evaporating the liquid to form solid agglomerates. These agglomerates may have the required particle size for the particular application, such as when the drying is carried out by spray drying or, when the agglomerates are large, the agglomerates can be crushed to achieve the required particle size. In all cases the agglomerates are classified. Then, the oversized fraction can be re-crushed to achieve the required particle size if shape is not important, or mixed with the liquid and reprocessed. The undersized fraction can be mixed with the liquid and reprocessed.

In a preferred embodiment of the method of the invention, the particulate solid lubricant is mixed with the binder in a weight ratio of about 19:1 to 1:19 of solid lubricant to binder, preferably in a weight ratio range of about 9:1 to 4:6 of solid lubricant to binder and more preferably in a weight ratio of about 8:2 of solid lubricant to binder, and mixed with water to produce a slurry in the range of about 5 to 60 weight % solids, preferably in the range of about 20 to 30 weight % solids. The slurry can be spray dried to form rounded agglomerates. The binder is preferably hydrophilic and may be selected from the group consisting of bentonite, fillers earth, montmorillonite and the like hydrous aluminum silicates.

Although the spray drying process is the preferred way of producing the product, other processes can be used. Heavy, viscous mixtures can be produced in large quantities (thousand $m^3$ or more), then dried and crushed. Another method would be drum pelletizing followed by crushing and sizing. Yet another method would be to extrude a "spaghetti-like" mass of solid lubricant-filler-binder-liquid followed by drying, crushing and sizing.

The binder can be either solid, liquid such as sodium silicate, or liquid slurry, or any combination thereof.

The filler can be one or more particulate solid material that can lower the cost of the product or improve the product properties, such as particulate polymers, ceramics or metals, or combination thereof. The filler can be added in an amount up to 40 volume % of the solids.

The solid lubricant is at least one of hexagonal boron nitride, graphite, calcium fluoride, magnesium fluoride, barium fluoride, tungsten disulfide and molybdenum disulphide powder, preferably hexagonal boron nitride or molybdenum disulphide powder.

One major advantage of the invention is that by choosing a binder of the invention the process achieves almost 100% recovery, even when extremely narrow particular particle sizes of the product are required. This has two substantial advantages: the cost of solid lubricant, such as hBN, is very high and therefore any gain in recovery significantly lowers the cost of the final product. Although spray drying, for example, is a low cost process, its influence on the cost of production is much less than the cost of hBN. The second advantage is due to the fact that narrow particle size cuts can be produced that are tailored perfectly to thermal spray process requirements. The results are much higher and more controllable deposit efficiency and subsequently lower cost of applied coatings.

The binder used in the process of this invention is preferably inorganic. Organic binders do not stand up well to the thermal spray process temperatures in which the flame temperatures are always above 2000° C. When the organic binder is burned, the agglomerated particle disintegrates and the thermal spray process becomes uncontrollable. Inorganic binders are very stable at high temperatures and, for that reason, more suitable for the thermal spray applications. The most suitable inorganic binders are those that have to be stabilized at temperatures higher than the drying temperature of the wet mixture. The low temperature processes for drying the mixtures contemplated in this invention do not stabilize the binder and the particles that fall outside the usable range can be readily reprocessed by re-dispersing the binder and solid lubricant and any filler in the liquid. Only after the right particle size cut is produced is the binder stabilized and rendered non-dispersible and ready for thermal spraying. Stabilized in this context means that the binder can no longer be redispersed in the liquid.

The solid lubricant agglomerate produced by any of the above-described methods is then blended or clad with a metal, a metal alloy or a metallic composition. For example, the metal, the metal alloy, or the metallic composition is in the form of a powder. The resultant composition is suitable for thermal spray applications.

BRIEF DESCRIPTION OF THE DRAWINGS

The method of the invention will now be described with respect to the accompanying drawings, in which.

DESCRIPTION OF THE PREFERRED EMBODIMENTS

Figure 1:
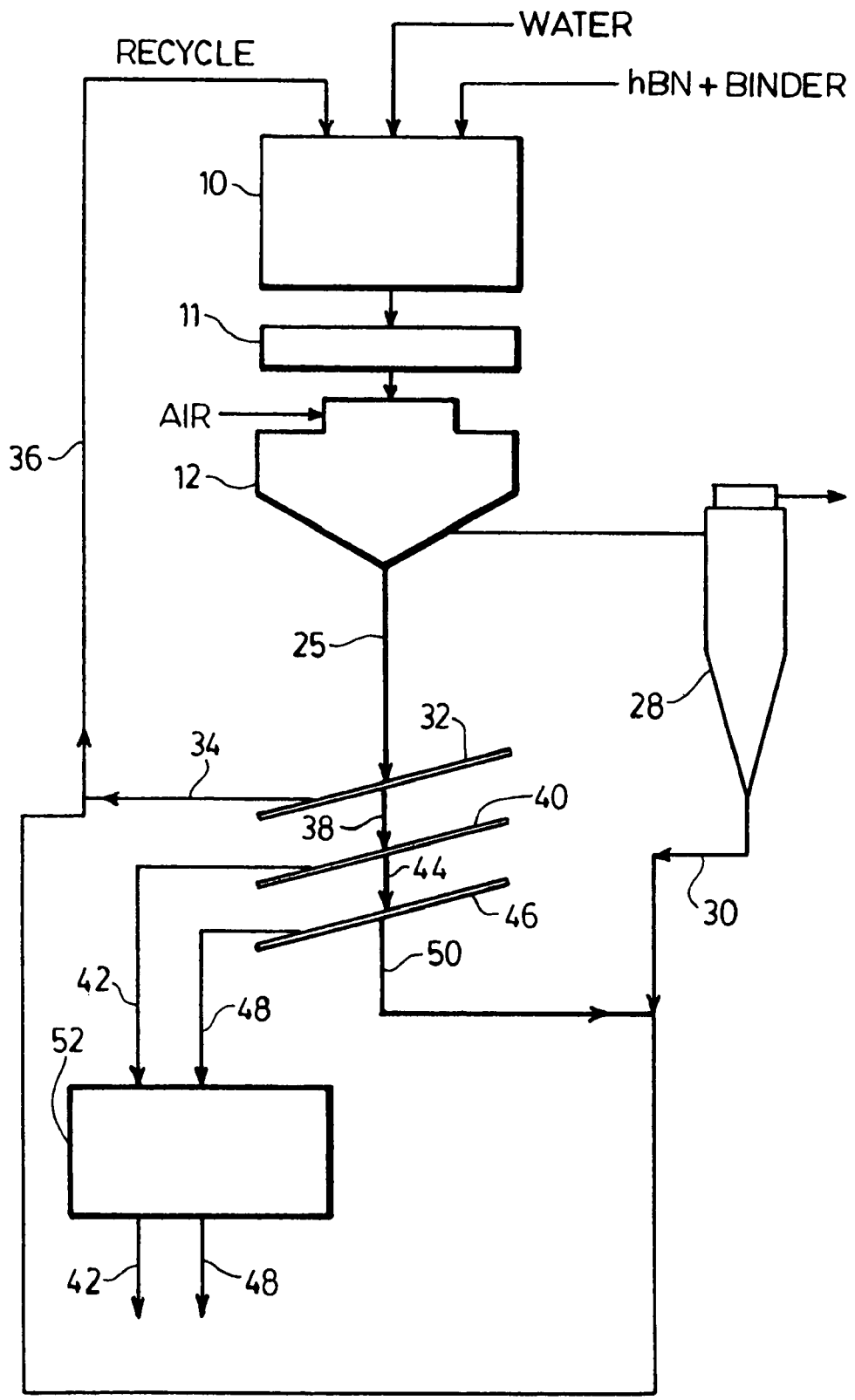
FIG. 1 is a flowsheet illustrating a preferred embodiment of the method of the invention.

With reference to FIG. 1, a preferred embodiment of the method of the invention is illustrated in which solid lubricant particles such as hBN particles, which may be crushed hBN or fine hBN particles having a size smaller than −325 mesh (45 micron), are blended with a binder typified by bentonite powder in a weight ratio of about 1:19 to 19:1 of hBN to binder, preferably in a weight ratio of about 9:1 to about 4:6 of hBN to binder, and more preferably in a weight ratio of about 8:2 hBN to binder, and slurried in water in mixing vessel 10 to provide a slurry of about 5 to 60 wt % solids in water, preferably about 20 to 30 wt. % solids in water, and transferred to tundish 11.

The water-solids slurry with the solids uniformly suspended therein can be atomized into droplets in spray chamber 12 into which heated drying air is passed. The water is evaporated from the droplets and the solids product collected continuously from the chamber. The binder glues the fine hBN particles together and agglomerates are formed.

Figure 2:
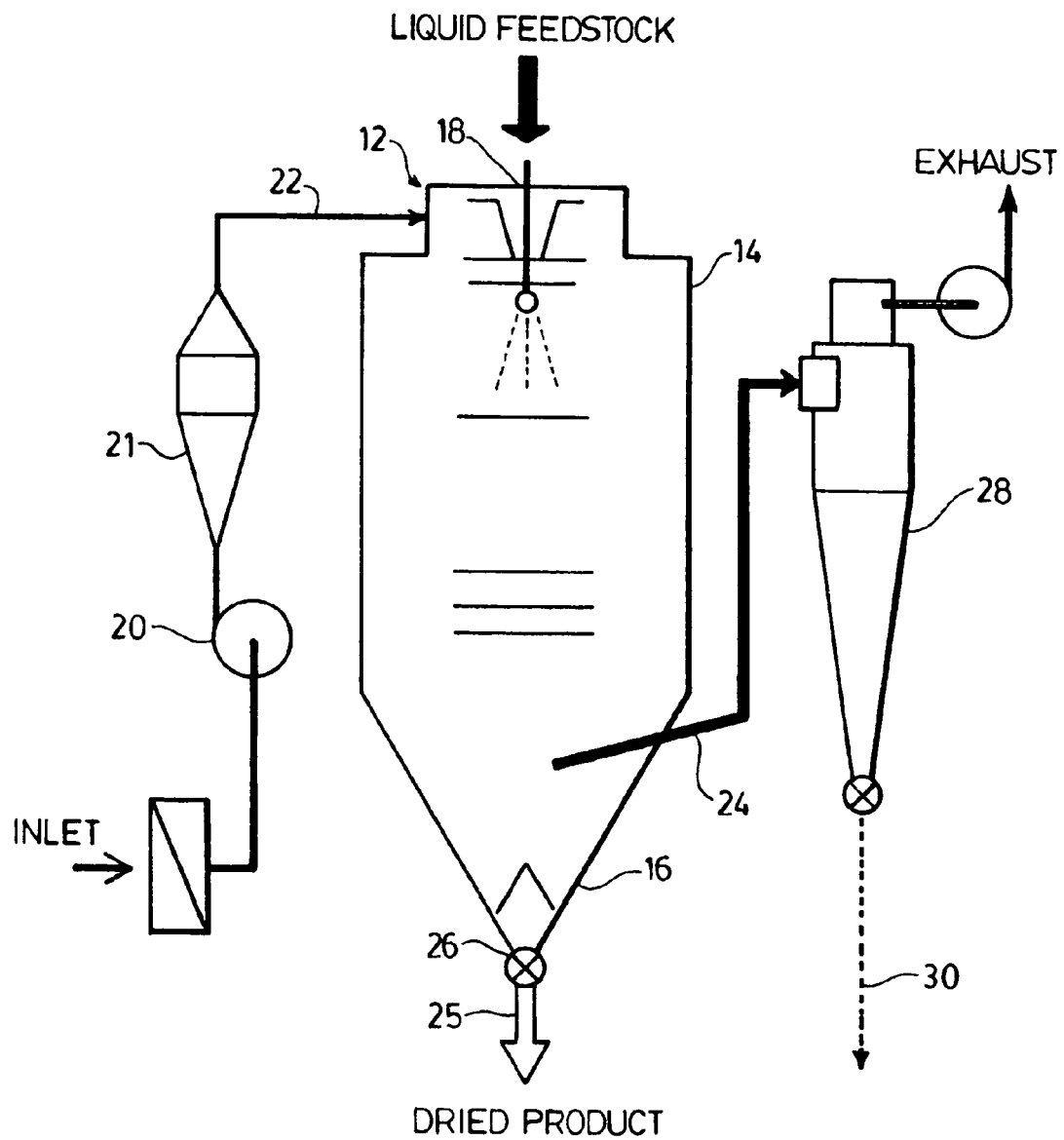
FIG. 2 is a schematic illustration of a spray drying system embodiment used in the method of the invention.

A typical spray drying chamber, detailed in FIG. 2, comprises cylindrical vessel 14 having conical bottom 16, into which liquids-solids slurry is fed at top inlet 18, heated drying air from blower 20 and heat exchanger 21 is fed tangentially at side inlet 22, drying air is exhausted at lower tangential outlet 24, and dried product fraction 25 is discharged at bottom apex outlet 26. Exhausted drying air passes through cyclone 28 for collection of a fines fraction 30. This fines fraction is added to the recycle stream 36.

In FIG. 1, product 25 is fed to first screen 32 for removal of oversize 34 which is added to the recycle stream 36. Undersize 38 from screen 32 is fed to second screen 40 for discharge of oversize as a first product cut 42 and undersize 44 fed to third screen 46 for discharge of second product cut 48. Undersize particles 50 from screen 46 are added to the recycle stream 36. The recycle stream 36 is added to mixing tank 10 in such a proportion to facilitate continuous operation and full recovery. Product cuts 42 and 48 are passed to oven 52 and heated to at least 850° C. to stabilize the binder thus rendering the particles refractory and strong and insoluble in water, the stabilized binder having the characteristics of insoluble ceramics.

In the event use of the agglomerate product in thermal spray applications does not require immediate stabilization, unstabilized product can be thermally sprayed onto a surface and the heat of thermal spraying stabilize the binder or the binder can be stabilized by the heat during the use of the coating at elevated temperatures.

In a typical operation, the spray dried product would be passed sequentially to a 100 mesh (149 micron openings) screen 32, a 200 mesh (74 micron openings) screen 40 and a 325 mesh (45 micron openings) screen 46, with the plus 100 mesh oversize fraction and the −325 mesh undersize fraction diverted to the recycle stream 36. The −100+200 mesh fraction and the −200+325 mesh fraction are collected as separate product cuts and heated in oven 52.

The production cost of the material is controlled by the cost of raw materials and the cost of manufacturing the product. Both costs are very low which makes this method very attractive from the cost point of view. The cost of fine hBN, for instance, is many times lower than that of coarse hBN. Also, the fine hBN particles are available from many low-cost sources as compared to coarse hBN particles available from only very few producers. The other major advantages are the very low cost of producing the spray dried particles compared to the high cost of the "hot press-crush-screen" approach and the high material recovery, usually higher than 95% and in many cases close to 100%.

Although the description has proceeded with reference to the use of bentonite as a binder and hBN as the solid lubricant particles to be agglomerated by the binder, it will be understood that the preferred binder is hydrophilic and is typified by bentonite, fuller's earth and montmorillonite which are hydrous aluminum silicates. Although it is understood that we are not bound by hypothetical considerations, it is believed the binders of hydrous aluminum silicates which permit reversible dehydration allow dispersion of the solid lubricant particles in water upon recycle of undersize and oversize agglomerates to water in mixer 10

Solid lubricants other than hBN can be used alone or mixed with hBN and the binder to reduce costs or add other properties to the product. Other solid lubricants are at least one of graphite, calcium fluoride, magnesium fluoride, barium fluoride, tungsten disulfide and molybdenum disulphide particles.

In some thermal spray applications, high amounts of porosity in the product are desirable. This can be achieved by adding a fugitive material such as a consumable polymer to the composition to provide an agglomerate product with increased porosity. A particulate polymer powder such as polyester of a size smaller than 325 mesh can be blended in an amount of about 1 to about 40% volume of the composition with the solid lubricant and binder powder, preferably in an amount of about 10 to 25%, in vessel 10 (FIG. 1). The fugitive polymer subsequently is vaporized or burned out to yield a porous, low density, open-cell product.

The method also provides flexibility to allow for the addition of other filler materials to either lower the cost or to improve the properties of the product. For example, particulate metals and ceramics such as alumina or quartz can be added to the mixture.

The stablized product is suitable for hydrometallurgical processing such as by metal alloy cladding, or the product can be blended with a metal, a metal alloy or a metallic composition for thermal spraying to produce abradable seals or anti-fretting coatings. For example, the metal, the metal alloy, or the metallic composition is in the form of a powder.

In this respect, in one embodiment, there is provided a solid lubricant agglomerate, produced by any one of the above-described methods, blended or clad with a metal, a metal alloy or a metallic composite powder. As suggested above, the resultant composition can then be used for thermal spraying to produce abradable seals or anti-fretting coatings. The resultant composition demonstrates higher deposit efficiency upon thermal spraying of this composition. Further, also upon thermal spraying of the resultant composition, higher retention of the solid lubricant is observed in the sprayed coating. The resultant coating presents improved lubricity and adradability.

An example of a suitable metal alloy for blending or cladding with the produced solid lubricant agglomerate is a CoCrAlY alloy.

As a further example, a solid lubricant agglomerate, produced by any of the above-described methods using hexagonal boron nitride powder as the solid lubricant and using bentonite as the inorganic binder, is blended or clad with either: (i) a metal selected from the group consisting of Ni, Co, Fe, Al, or Cu, (ii) a metal alloy selected from the group consisting of alloys of Ni, Co, Fe, Al, or Cu and combinations thereof, or (iii) a metallic composition, wherein the metallic constituent of the metallic composition includes a metal selected from the group consisting of Ni, Co, Fe, Al, or Cu. For example, the metal, the metal alloy, or the metallic composition is in the form of a powder.

As yet a further example, a solid lubricant agglomerate, produced by any of the above-described methods using hexagonal boron nitride powder as the solid lubricant and using bentonite as the inorganic binder, is blended with a composite powder, such as nickel chrome aluminium bentonite, in order to improve the lubricity and abradability of the thermally sprayed coating. For example, the solid lubricant agglomerate has 80 weight % hexagonal boron nitride powder and 20 weight % bentonite, based on the total weight of the solid lubricant agglomerate. This solid lubricant agglomerate (produced using hexagonal boron nitride powder as the solid lubricant and using bentonite as the inorganic binder) is blended with nickel chrome aluminium bentonite powder (for example, nickel chrome aluminium bentonite powder solid under the trade-mark Durablade 2313), such that the proportion of nickel chrome aluminium bentonite powder (being blended with this solid lubricant agglomerate) is 85 weight % based on the total weight of the nickel chrome aluminium bentonite powder and this solid lubricant agglomerate being blended.

As yet a further example, a solid lubricant agglomerate, produced by any of the above-described methods using hexagonal boron nitride powder as the solid lubricant and using bentonite as the inorganic binder, is blended with cobalt chromium aluminium yttrium (CoCrAlY) alloy powder. For example, the solid lubricant agglomerate has 80 weight % hexagonal boron nitride powder and 20 weight % bentonite, based on the total weight of the solid lubricant agglomerate. This solid lubricant agglomerate is blended with the CoCrAlY alloy powder, such that the proportion of the CoCrAlY alloy powder (being blended with this solid lubricant agglomerate) is 85 weight % based on the total weight of the CoCrAlY alloy powder and this solid lubricant agglomerate being blended.

It will be understood that other embodiments and examples of the invention will be readily apparent to a person skilled in the art, the scope of the invention being defined in the appended claims.

The invention claimed is:

1. A method for producing a blended or clad composition comprising:
   (a) admixing particulate solid lubricant, an inorganic binder, and a liquid to produce a mixture having about 5 to 60 weight % solids based on the total weight of the mixture, wherein the ratio of the weight of the solid lubricant being admixed to the weight of the binder being admixed is from about 19:1 to about 1:19;
   (b) drying the mixture to produce a dry agglomerate;
   (c) classifying the dry agglomerates by size, or milling and classifying the dry agglomerates by size, into an undersize particle fraction, an onsize particle fraction and an oversize particle fraction, admixing the undersize particle fraction with the particulate solid lubricant, the inorganic binder and the liquid, admixing the oversize particle fraction with the particulate solid lubricant, the inorganic binder and the liquid, for redispersion of the undersize and the oversize particle fractions in the liquid to form the mixture, and heating the onsize particle fraction to a temperature effective to render the binder in the dry agglomerate of the onsize particle fraction non-dispersible in the liquid; and
   (d) blending or cladding the dry agglomerate with either: (i) a metal selected from the group consisting of Ni, Co, Fe, Al, or Cu, (ii) a metal alloy selected from the group consisting of alloys of Ni, Co, Fe, Al, or Cu and combinations thereof, or (iii) a metallic composition, wherein the metallic constituent of the metallic composition includes a metal selected from the group consisting of Ni, Co, Fe, Al, or Cu.

2. The method as claimed in claim 1, wherein the inorganic binder is selected from the group consisting of bentonite, fullers earth and montmorillonite.

3. The method as claimed in claim 1, wherein the ratio of the weight of the solid lubricant being admixed to the weight of the binder being admixed is from about 9:1 to about 4:6.

4. The method as claimed in claim 1, wherein the ratio of the weight of the solid lubricant being admixed to the weight of the binder being admixed is about 8:2.

5. The method as claimed in claim 2, wherein the solid lubricant is at least one lubricant selected from the group consisting of hexagonal boron nitride, graphite, calcium fluoride, magnesium fluoride, barium fluoride, tungsten disulphide and molybdenum disulphide particles.

6. The method as claimed in claim 2, wherein the solid lubricant is hexagonal boron nitride.

7. The method as claimed in claim 6, wherein the ratio of the weight of hexagonal boron nitride being admixed to the weight of the binder being admixed is from about 9:1 to about 4:6.

8. The method as claimed in claim 6, wherein the ratio of the weight of hexagonal boron nitride being admixed to the weight of the binder being admixed is about 8:2.

9. The method as claimed in claim 6, wherein the mixture comprises 20 to 30 weight % solids based on the total weight of the mixture.

10. The method as claimed in claim 6, wherein the binder comprises bentonite.

11. The method as claimed in claim 10, wherein the dry agglomerate is blended with nickel chromium aluminium bentonite composite powder.

12. The method as claimed in claim 10, wherein the dry agglomerate is blended with CoCrAlY alloy powder.

13. The method as claimed in claim 6, wherein the binder is hydrous aluminium silicate.

14. A composition produced in accordance with a method comprising:
   (a) admixing particulate solid lubricant, an inorganic binder, and a liquid to produce a mixture having about 5 to 60 weight % solids based on the total weight of the mixture, wherein the ratio of the weight of the solid lubricant being admixed to the weight of the binder being admixed is from about 19:1 to about 1:19;
   (b) drying the mixture to produce a dry agglomerate;
   (c) classifying the dry agglomerates by size, or milling and classifying the dry agglomerates by size, into an undersize particle fraction, an onsize particle fraction and an oversize particle fraction, wherein the undersize particle fraction is admixed with the particulate solid lubricant, the inorganic binder, and the liquid and wherein the oversize particle fraction is admixed with the particulate solid lubricant, the inorganic binder, and the liquid for redispersion of the particle fractions in the liquid to form the mixture; and heating the binder in the onsize fraction of the blended or clad agglomerate to a temperature effective to render the binder non-dispersible in the liquid; and
   (d) blending or cladding the dry agglomerate with either: (i) a metal selected from the group consisting of Ni, Co, Fe, Al, or Cu, (ii) a metal alloy selected from the group consisting of alloys of Ni, Co, Fe, Al, or Cu and combinations thereof, or (iii) a metallic composition, wherein the metallic constituent of the metallic composition includes a metal selected from the group consisting of Ni, Co, Fe, Al, or Cu.

15. The composition as claimed in claim 14, wherein the inorganic binder is selected from the group consisting of bentonite, fullers earth and montmorillonite.

16. The composition as claimed in claim 14, wherein the ratio of the weight of the solid lubricant being admixed to the weight of the binder being admixed is from about 9:1 to about 4:6.

17. The composition as claimed in claim 14, wherein the ratio of the weight of the solid lubricant being admixed to the weight of the binder being admixed is about 8:2.

18. The composition as claimed in claim 14, wherein the solid lubricant is at least one lubricant selected from the group consisting of hexagonal boron nitride, graphite, calcium fluoride, magnesium fluoride, barium fluoride, tungsten disulphide and molybdenum disulphide particles.

19. The composition as claimed in claim 14, wherein the solid lubricant is hexagonal boron nitride.

20. The composition as claimed in claim 19, wherein the ratio of the weight of hexagonal boron nitride being admixed to the weight of the binder being admixed is from about 9:1 to about 4:6.

21. The composition as claimed in claim 19, wherein the ratio of the weight of hexagonal boron nitride being admixed to the weight of the binder being admixed is about 8:2.

22. The composition as claimed in claim 19, wherein the mixture comprises 20 to 30 weight % solids based on the total weight of the mixture.

23. The composition as claimed in claim 19, wherein the binder comprises bentonite.

24. The composition as claimed in claim 23, wherein the dry agglomerate is blended with nickel chromium aluminium bentonite composite powder.

25. The composition as claimed in claim 23, wherein the dry agglomerate is blended with CoCrAlY alloy powder.

26. The composition as claimed in claim 19, wherein the binder is hydrous aluminium silicate.

* * * * *